United States Patent [19]

Muscatell

[11] Patent Number: 4,624,426

[45] Date of Patent: Nov. 25, 1986

[54] FUEL DUMP MECHANISM FOR AIRCRAFT

[76] Inventor: Ralph P. Muscatell, 2007 NE. 20th Ave., Fort Lauderdale, Fla. 33305

[21] Appl. No.: 635,802

[22] Filed: Jul. 30, 1984

[51] Int. Cl.$^4$ .......................... B64D 37/26; B64D 1/16
[52] U.S. Cl. .................. 244/135 R; 239/271; 251/58
[58] Field of Search ............ 244/135 R, 136, 99; 239/171; 251/58, 144

[56] References Cited

U.S. PATENT DOCUMENTS

| | | |
|---|---|---|
| 1,737,123 | 11/1929 | Page .......................... 244/135 R |
| 2,573,207 | 10/1951 | Lipman ..................... 244/135 R |
| 2,719,015 | 9/1955 | Anderson ..................... 244/99 |
| 3,020,018 | 2/1962 | Stram ........................... 251/58 |
| 3,089,677 | 5/1963 | Savaria ........................ 251/144 |
| 4,253,626 | 3/1981 | Muscatell . |
| 4,441,673 | 4/1984 | Muscatell . |

FOREIGN PATENT DOCUMENTS

| | | | |
|---|---|---|---|
| 2637200 | 3/1977 | Fed. Rep. of Germany ... 244/135 R |
| 610319 | 9/1926 | France ..................................... 244/99 |
| 615946 | 1/1927 | France .............................. 244/135 R |
| 620204 | 4/1927 | France .............................. 244/135 R |

*Primary Examiner*—Galen L. Barefoot
*Attorney, Agent, or Firm*—Oltman and Flynn

[57] ABSTRACT

Fuel dumping valve for aircraft for fast emergency evacuation of fuel contained in the aircraft's fuel tanks, consisting of a valve head seated in a valve seat and mechanical or hydraulic linkage for opening or closing the valve from the pilot's seat. The valve may have hydraulically inflatable seals for completely sealing the valve against fuel leakage, and hydraulically controlled locking pins for holding the valve locked in the valve seat until deployment. An interlocking sequencing control mechanism is provided for retracting the locking pins, releasing the sealing pressure and activating the valve.

11 Claims, 17 Drawing Figures

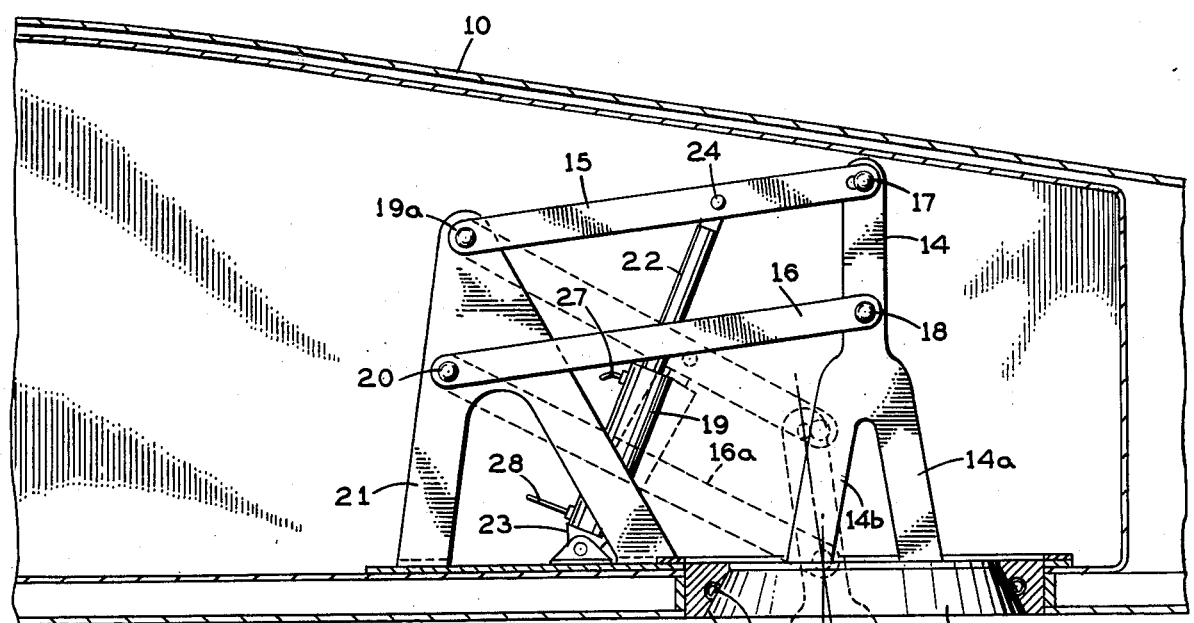
FIG. 1
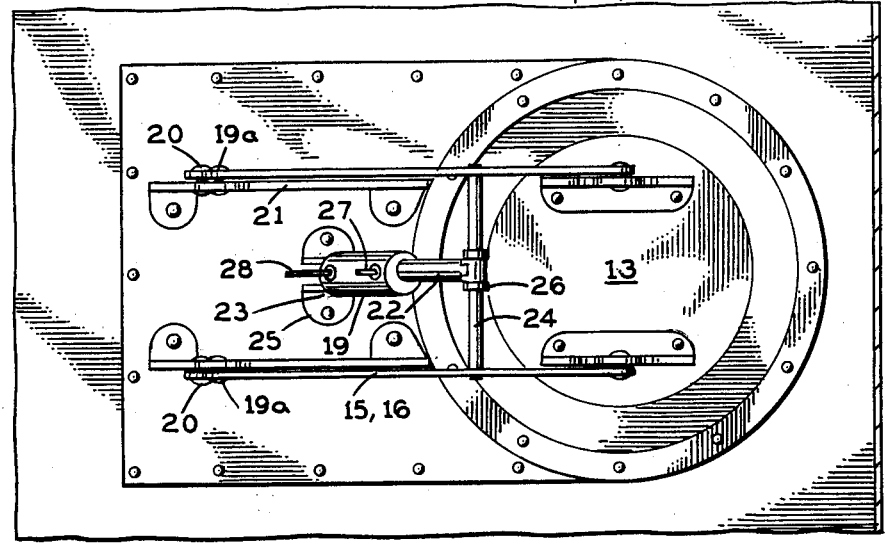
FIG. 2
FIG. 3

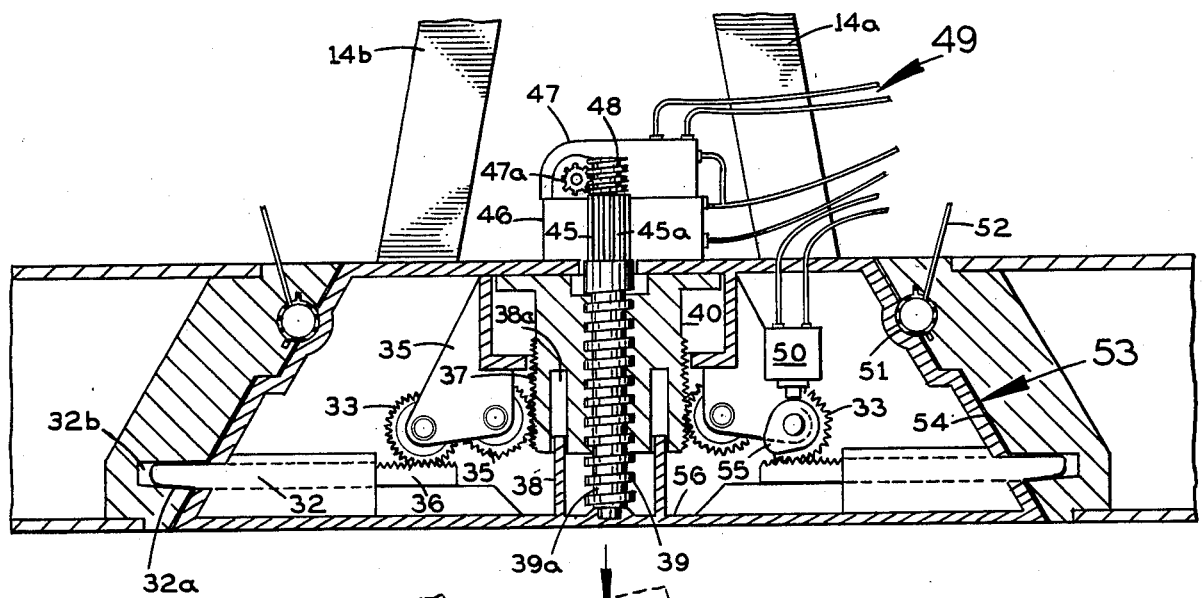
FIG. 5
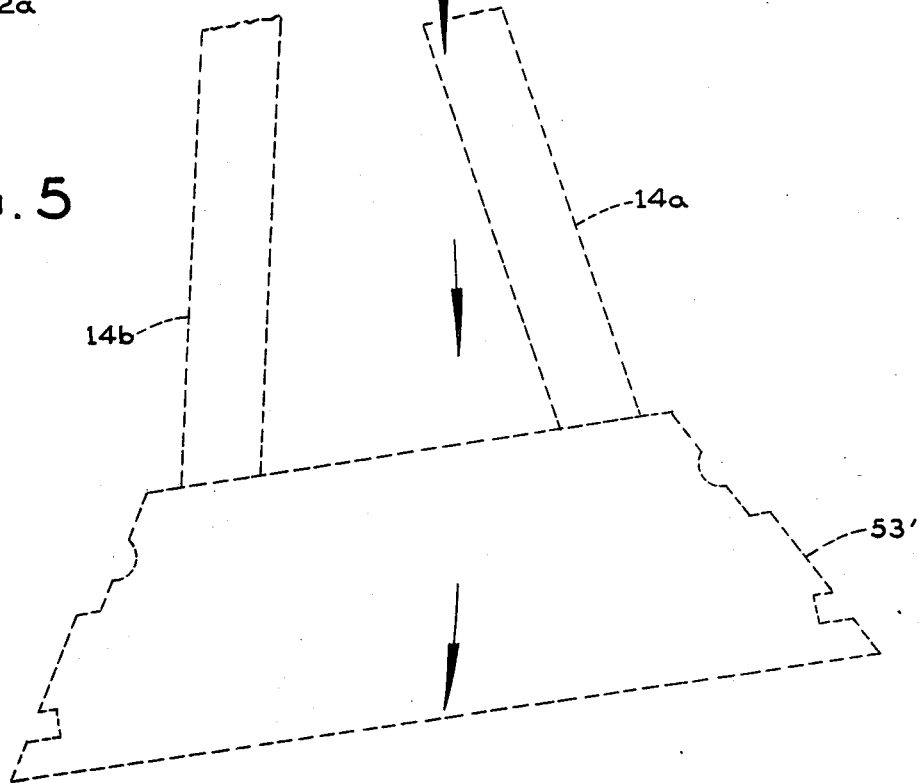

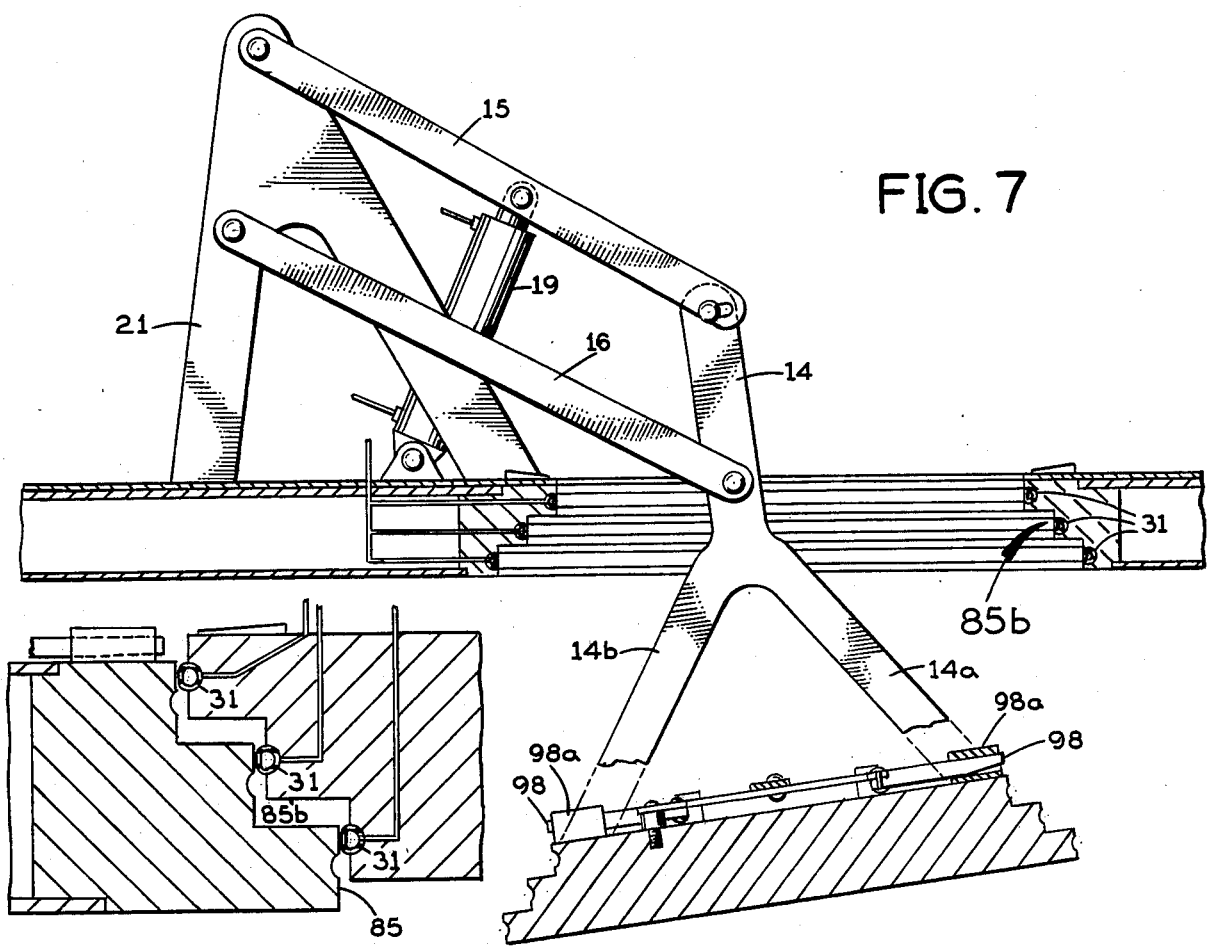
FIG. 7
FIG. 8
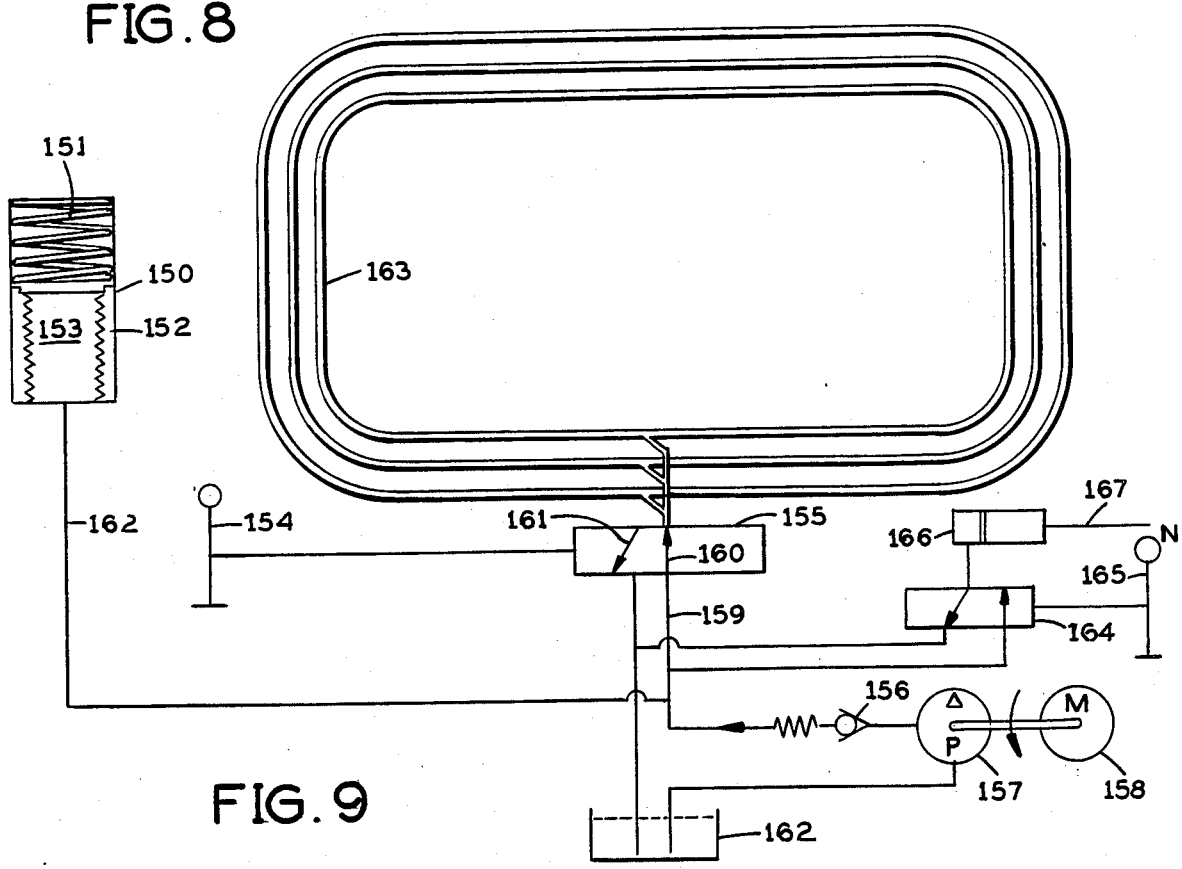
FIG. 9

FUEL DUMP MECHANISM FOR AIRCRAFT

BACKGROUND OF THE INVENTION

The invention relates to fuel release mechanisms for aircraft and in particular to mechanisms for quickly releasing or "dumping" a large amount of fuel in a short time The need for a fuel dump mechanism may arise when a pilot of an aircraft, for whatever reasons, faces an impending forced landing wherein structural damage to the aircraft may happen.

In a conventional aircraft most of the fuel is contained in tanks in wings which is the best suited location, but the wings are also exposed and are often damaged in forced landings.

Most aircraft have means for releasing fuel to the outside whenever a landing other than normal is expected. These conventional fuel release means are slow, since the fuel to be released is pumped out of the tanks to an external vent by engine driven pumps.

At times, however, in case of emergencies there may not be sufficient time or engine power available for evacuating the tanks. The instant invention is for use in such situations and contemplates a quick sudden release of a large amount of fuel by means of large fuel dumping valves in the wing tanks, in order to avoid a forced landing with possible damage to the fuel tanks and the attendant fire danger if the fuel should be spilled and ignited at the landing.

There may be situations, such as fire in the aircraft, the fuel tanks or in an engine, wherein quick release of fuel may save the aircraft. Releasing the fuel, if there is a fuel cell fire, effectively puts out the fire; where there are no other means in the present art. Such situations may be caused by collisions in the air, air combat or the like.

The quick releasing of a heavy fuel load has the additional benefit of lightening the aircraft which results in a significantly greater power to weight ratio, which, in an emergency may enable the pilot to regain control of the aircraft, or the aircraft to reach a more favorable landing location.

SUMMARY

The instant invention contemplates fuel dumping valves placed in the underside of the wing tanks with venting directly to the outside airstream flowing under the wings.

The airflow enhances the quick release of fuel due to the airflow being tangential to the wing underside and enhances the release of the fuel from the valve openings.

The contemplated fuel dumping valves, according to the teachings of the invention, have large valve openings and valve bodies normally covering the valve openings so that fuel can be released quickly.

At the same time the valve mechanisms must meet a number of criteria that are especially important in aircraft. The valve mechanisms, especially, must be very reliable in both retaining fuel when not in use, and they must be capable of responding reliably when activated by a pilot.

The valve mechanisms must be so constructed that the valves can be inspected and tested for proper operation at the periodic inspections required for aircraft frames and equipment.

The valve mechanisms, furthermore, must be of low weight, since additional weight is extremely important in aircraft. The use of alloys of aluminium or the like are recommended.

Other objects of this invention will appear from the following description and appended claims, reference being had to the accompanying drawings forming a part of this specification wherein like reference characters designate corresponding parts in the several views.

BRIEF DESCRIPTION OF THE DRAWINGS

FIG. 1 is a vertical cross-sectional view through an aircraft wing and through a fuel tank in the wing. The fuel tank has a fuel dumping valve according to the invention.

FIG. 2 is an enlarged vertical, fragmentary, detail side view of the fuel dumping valve of FIG. 1, showing the forward placed guiding levers and support attachment with valve in open position in phantom lines.

FIG. 3 is a horizontal, fragmentary top-down detail view of the valve mechanism of FIG. 2 showing details of the valve controls and movement guidance levers.

FIG. 5 is a vertical, fragmentary, cross-sectional view of an embodiment of the invention having locking pins and pressure sealable valve body seals, and also showing in phantom lines the valve head in extended positon.

FIG. 7 is a cross-sectional fragmentary side view of the embodiment of FIG. 6 having multiple inflatable seals for sealing the valve head.

FIG. 8 is an enlarged, fragmentary detail view of the inflatable seals of the valve seat, partially opened.

FIG. 9 is a hydraulic line diagram of the hydraulic circuit for maintaining the inflatable seals of FIG. 7 and 8 under pressure.

DETAILED DESCRIPTION OF THE PREFERRED EMBODIMENTS

Figure 4:
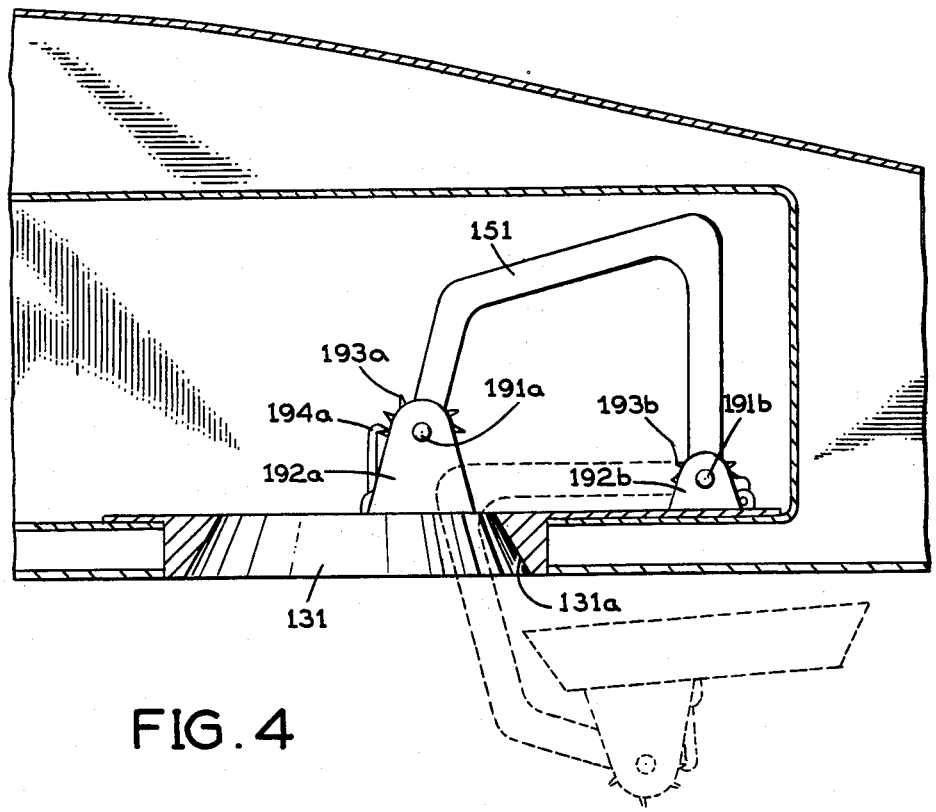
FIG. 4 is a vertical, fragmentary, cross-sectional view of an embodiment having rearwardly placed double hinged guiding levers with the valve in open position in phantom lines.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

In the following detailed description, the preferred embodiments are described in reference to the figures in the physical orientation shown therein.

In FIGS. 1–4a the valve head is shown in outline only. Details of the valve head with latching and sealing mechanisms are presented in FIGS. 5, 5a, 7 and 8.

In FIG. 1 there is seen a vertical cross-section through an airplane wing 10, showing a cross-section through a fuel tank 11 and a fuel-dumping valve generally at 12. In normal flight, the airflow under the wing flows in the direction from front to rear of the wing, indicated by the arrow 13.

In FIG. 2, an enlarged view of the valve 12 of FIG. 1 is shown, wherein a valve head 13 is seated in a valve seat 13a and maintained in the seated position by means of a set of almost parallel pivoting levers 15 and 16, pivotally attached at the rearward facing end to a valve stem 14.

The valve stem 14 branches downward apart into two legs 14a and 14b which are, at their lower ends, attached to the valve head 13. The levers 15 and 16 are at their forward facing ends 19a and 20 pivotally attached to a triangular frame member 21 at the forward pivot points 19a and 20. The forward pivot points 19a and 20 are spaced a short distance farther apart than the rearward facing pivot points 17 and 18, so that the valve stem, when the valve is deployed, assumes a slight downward and rearward tilt of a few degrees angle $\alpha$ to the vertical line as indicated by the stippled lines defining the angle $\alpha$ on FIG. 2. The valve head 13 is disposed in a plane perpendicular to the valve stem 14 and therefore, when deployed, as shown in FIG. 2 in phantom lines, the valvehead 13' assumes a tilt corresponding to angle $\alpha$ to the plane defined by the valve seat. This tilt of the valvehead when deployed, cooperates with the airflow under the wing to keep the valve wide open and further serves to assist in the quick removal of fuel rushing out of the valve opening vacated by the valve seat 13a. In the preferred embodiment of the fuel dumping valve, as best seen in the top-down view in FIG. 3, the valve supporing mechanism consists of two complementary parallel assemblies speced apart a distance somewhat less than the diameter of the valve head 13.

The two parallel upper levers are connected by a rigidly attached transverse rod 24, which is in turn at its midpoint connected to the clevis 26 of the piston rod 22 of a hydraulic cylinder 19. The cylinder is at its opposite end, the cap end, attached pivotally in a cap end clevis 23 to a mounting plate 25. The mounting plate 25 is attached by rivets, screws or other suitable means to the bottom plate of the tank. The hydraulic cylinder 19 is preferably a double acting cylinder with two hydraulic connections 27 at the rod end and 28 at the cap end which serve to open and close the valve under control of a hydraulic control circuit controlled by the aircraft's pilot.

FIG. 4 is a vertical, cross-sectional side view of the invention presenting an alternate means of guiding suspension levers 151. The rearward placed levers are shaped as three sides of a trapezium rigidly affixed to the rearward to an axle shaft 191b which is affixed by insert bearing to rearward clevis 192b, b'. To the forward the levers are rigidly affixed to axel shaft 191a which is affixed by insert bearing to valve head clevis 192a, a'. The rearward clevis 192b, b' is attached by screws or rivets to the valve seat 131a, the forward clevis 192a, a' similarily attached to the valve head 131. Affixed to valve head axel shaft 191a is ratchet gear 193a, a' set and to rearward axel shaft 191b also a ratchet gear set 193b, b'. Ratchet stop levers 194a, and 195b, b' hingedly and by internally placed spring tension enjoin the ratchet gears.

When the valvehead is unlatched by internal mechanism shown in detail herein below in FIGS. 5 or 5a the valvehead 131 will be free to move downward urged by the weight of fuel, and after slightly open, by the airstream. The rearward trapezium axel shaft 191b rotates in the bearing mount of the valve seat clevis 192b, b' allowing downward movement of the assembly. The valvehead 131 is also able to rotate via valve head axel shaft 191a, a' bearing affixed to valve head clevis 192a. Thus the valvehead moves downward, rearward and turns upside down cooperatively with the urging of the weight of the fuel and the windstream. Reverse rotation is prevented by action of the ratchet sets.

Figure 4A:
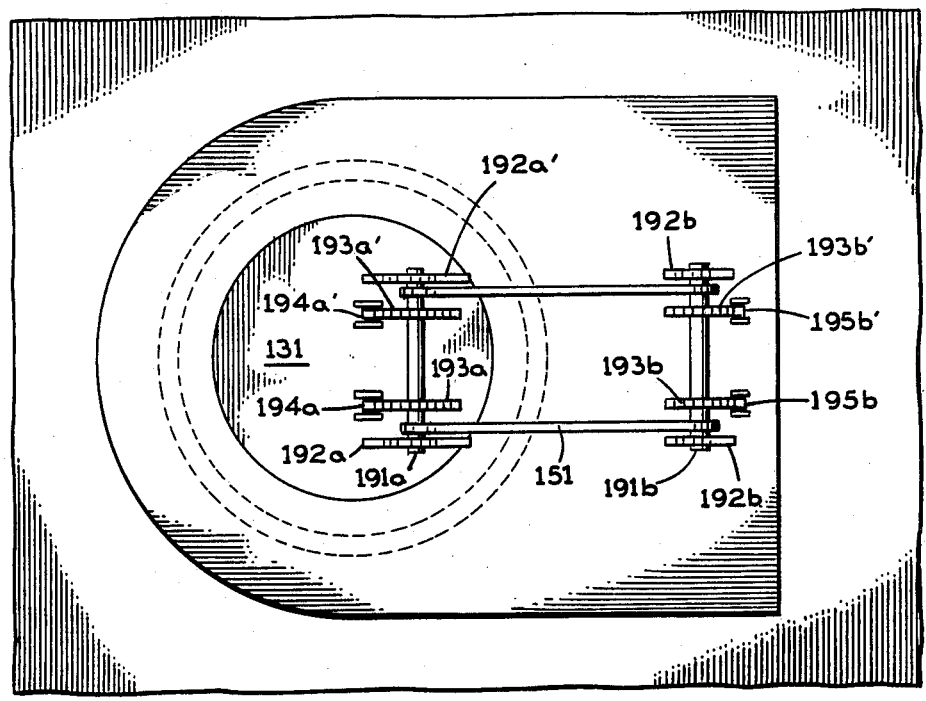
FIG. 4a is a horizontal, fragmentary top-down detail view of the valve mechanism of FIG. 4 showing details of the valve suspension levers.

FIG. 4a is a horizontal top-down view of FIG. 4 showing in greater clarity the mechanisms as described for FIG. 4.

The valve seat 13a may advantageously have sealing O-rings 31 disposed concentrically in inside peripheral grooves and operating to provide a tight seal against loss of fuel.

FIG. 5 shows an improved embodiment of the fuel dumping valve of FIGS. 1–4a. In this improved version, the valve head generally at 53 contains a plurality of retractable locking pins 32 that are radially moveable from an extended locking position as shown in FIG. 5 in which the distal ends 32a of the locking pins 32 are received in matching openings 32b disposed radially in the valve seat 54. The locking pins 32, when extended into their receiving openings 32b effectively retain the valve head 53 locked in its closed position in the valve seat 54. A locking pin retracting train operates to retract the pins 32 immediately prior to the opening of the valve. The train consists of: a horizontal rack 36 on the locking pin 32, engaging a first vertical pinion 33, the latter engaging a second vertical pinion 35, the latter engaging a vertical rack 37 on the vertically slidable nut carriage 40, having a central threaded hole 39, the latter receiving a vertical threaded spindle 39a. The spindle 39a, when rotated by a hydraulic motor 46 operates to move the nut carriage 40 between an upper locking position as shown in which the locking pins are in their extended locking position and a lower non-locking position in which the locking pins 32 are retracted, and clearing the locking pin recesses 32b. The upper end 45 of the spindle 39a engages the hydraulic motor 46 by means of axial keyways.

A hydraulic deflating valve 47 has a rotary valve shaft 47a engaging a threaded extension 48 of the spindle 39a so that when the locking pins 32 are retracted from their locking positions, the hydraulic valve 47 operates to remove hydraulic pressure from a circular inflatable valve seal 51 disposed in a circular groove in the valve seat 54. The inflatable seals 51 are normally inflated by hydraulic pressure supplied by a hydraulic control circuit described hereinbelow.

When the inflatable valve seal 51 has been deflated, a second hydraulic valve 50 is activated by a cam 55 attached to one of the first vertical pinions 33 and operates to power the hydraulic cylinder 19 seen in FIGS. 2 and 3, which in turn extends the valve head 53 for dumping of the fuel. The extended valve head is shown as 53' in phantom lines in FIG. 4.

The locking pins 32 advantageously have a slightly upward sloping underside at their distal end 32a, so that, as the locking pins enter their recess 32b, the valve head 53 is urged upward against the valve seat 54 for a tighter fit.

Guidepins 38, vertically disposed and rigidly attached to the upper, inner surface 56 of the hollow valve head 53, are received in matching cylindrical holes 38a in the nut carriage 40, which is thereby prevented from turning, as the spindle 39 is rotated.

The valve head 53 may be shaped as a circular truncated cone with an inward, upward tapering, decreasing cross-section, but can also have other shapes such as a laterally elongated cross-section or other shapes that may best fit the structure of the fuel tank and the aircraft wing.

Figure 5A:
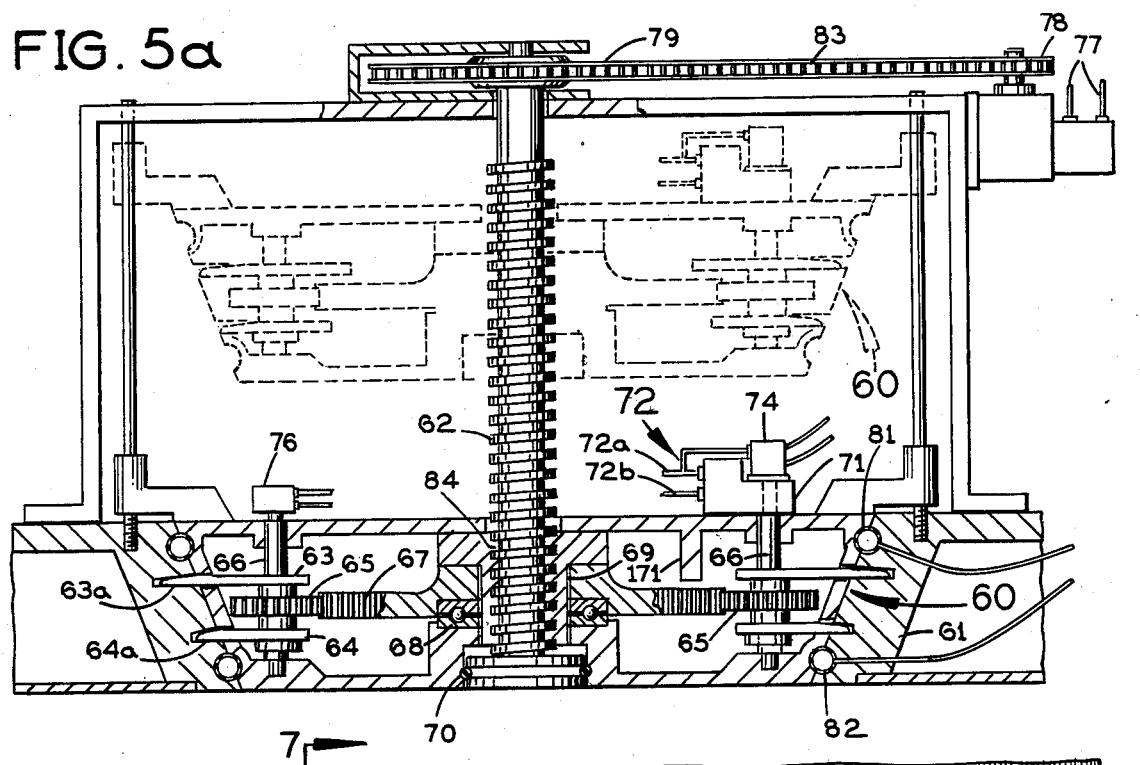
FIG. 5a is a cross-sectional vertical view of an embodiment of the invention having a planetary gear system for retracting the locking pins.

FIG. 5a shows still another embodiment of the fuel dumping valve which has a valve head 60 that is tapered inward in the downward direction and therefore, when activated, is moved upward to the position 60' shown in phantom lines from its matching valve seat 61 by a threaded spindle 62.

The hollow valve head 60 contains elements normally locking the valve head 60 in its seated position; the elements are horizontal upper eccentric discs 63 and lower eccentric discs 64 mounted on rotatable short vertical shafts 66. Planetary gear wheels 65 are rigidly attached to the rotatable shafts 66 and engage a common central sun gear wheel 67, which is rotatably, loosely connected with a central vertical shaft section 69 and engages an antifriction ball bearing 68. The eccentric discs are mounted on the vertical shafts 66 such that, in their locking position, part of the disc is received in matching slots 63a and 64a, which project radially outward from the axis of the valve head 60 and into the wall of the valve seat 61. A hydraulic motor 71, driven from hydraulic lines 72, under control of a hydraulic control circuit described in more detail below, engages an upper end 73 of one of the short vertical shafts 66, such that, when the motor 71 is hydraulically activated it turns the corresponding short vertical shaft 66, which in turn, rotates the corresponding planet gear 65, which again turns the central sun gear wheel 67, which again turns the other planet gears 65, thereby rotating all the eccentric, horizontal discs 63 and 64 out of engagement with their matching slots 63a and 64a, which unlocks the valve head 60 so that it can freely move upward along its axis.

The shaft extension 73 described above, also engages a rotary hydraulic draulic valve 74 mounted atop the motor 71, which serves to control hydraulic pressure to the inflatable seals 60 and 61, which, when deflated, allow the valve head 60 to disengage from the valve seat 61.

A second rotary hydraulic valve 76, engaging another one of the short vertical shafts 66 through a short extension 73 operates when the eccentric discs have rotated fully and disengaged from the valve seat to activate a second hydraulic motor 80 through hydraulic lines 75 and 77, which in turn operates to turn the threaded spindle 62 through a small horizontal sprocket wheel 78, driven by the motor 80 and in turn, via the drive chain 83, driving a larger sprocket wheel 79, engaging the threaded spindle 62. The threaded spindle 62 engages a short matching female thread 84 that is disposed concentrically with the axis of the valve head 60 and serves to lift the valve head 60 from engagement with the valve seat 61 to its open position 60' wherein fuel is allowed to escape through the open valve seat 61.

The rotation of the eccentric discs 63 when disengaging from the matching slots 63a is stopped by a mechanical projection 171 rigidly attached to the internal valve head structure which engages a coordinated projection 172, rigidly attached to one of the eccentric discs 63, when all the discs 63 have completely disengaged from the slots 63a.

Figure 6:
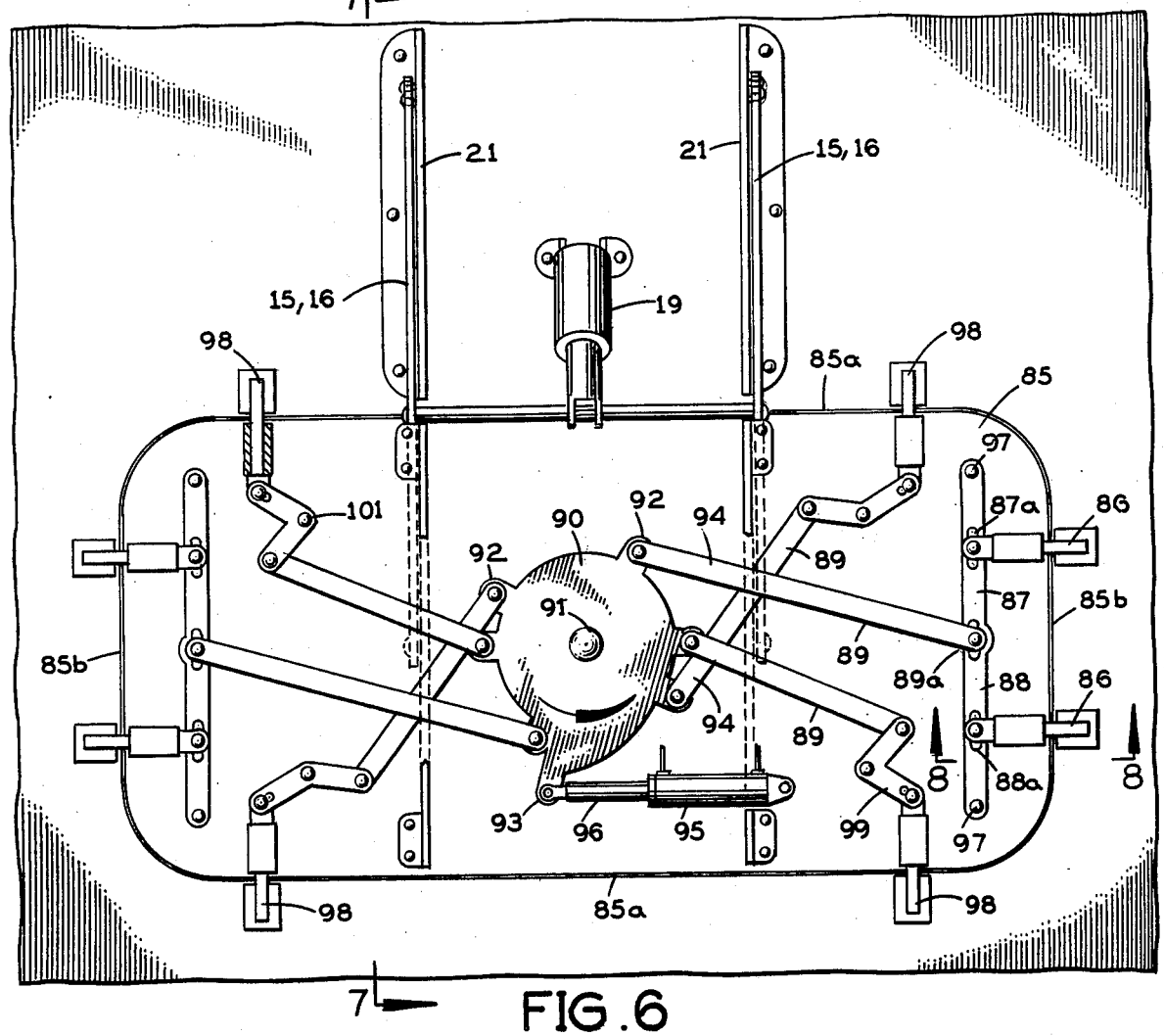
FIG. 6 is a top-down diagrammatic view of an embodiment of the invention having locking pins controlled by cantilevered control bars.

In still another embodiment of the invention, shown in a top-down view in FIG. 6, a valve head 85 comprises a locking arrangement consisting of horizontal locking pins 86 operated by a system of horizontal pivoted levers 87 and 88 connected through operating bars 89 with an operating wheel 90. The operating wheel 90 is rotatably attached to the valve head 85 at its axis 91 and at its periphery at pivot points 92 engages the inward ends 94 of the operating bars 89. The rotating wheel 90 can be rotated within a limited range between a locking position as shown, and wherein the locking pins 86 hold the valve head 85 in its locked position and a non-locking position in which the locking pins 86 are retracted and wherein the valve head 85 is able to move to an open position, guided by parallel, vertically pivoted levers 15, 16 under control of a hydraulic cylinder 19, in an arrangement quite analogous to that described above and shown in FIGS. 1, 2 and 3.

The rotating wheel 90 engages at pivot point 93 a hydraulic cylinder 95 with rod 96 which operates to rotate the operating wheel 90 between its locking and non-locking position.

The horizontal levers 87 and 88 are at their proximal ends pivotally attached at pivot points 97 to the valve head 85 and at their distal ends to the distal ends 89a of the operating bars 89.

As seen in FIG. 6, the valve head has a rectangular elongated shape with rounded corners having two parallel long sides 85a and two parallel short sides 85b.

As also seen in FIGS. 6, 7 and 8, the locking pins 86, described above, engage the short sides 85b of the perimeter of the valve seat and locking pins 98 engage the long sides 85a. The locking pins 98 are operated by the associated locking bars 89 through angle-shaped intermediary members 99, that are pivotably, at pivot points 101, attached to the valve head 85.

FIG. 7 shows the embodiment of FIG. 6 in a side view seen from one of the short sides 85b of the valve head 85 in its extended position, seen in cross-section, with the locking pins 98 retracted into their guide collars 98a. The valve seat 85b is also shown in cross-section with inflatable seals 31 embedded in the valve seat perimeter. FIG. 8 is an enlarged fragmentary detail of a cross-section of the valve head 85 and the valve seat 85b, seen along the line 8—8 of FIG. 6, showing the inflatable seals 31 after they have been deflated.

Figure 10:
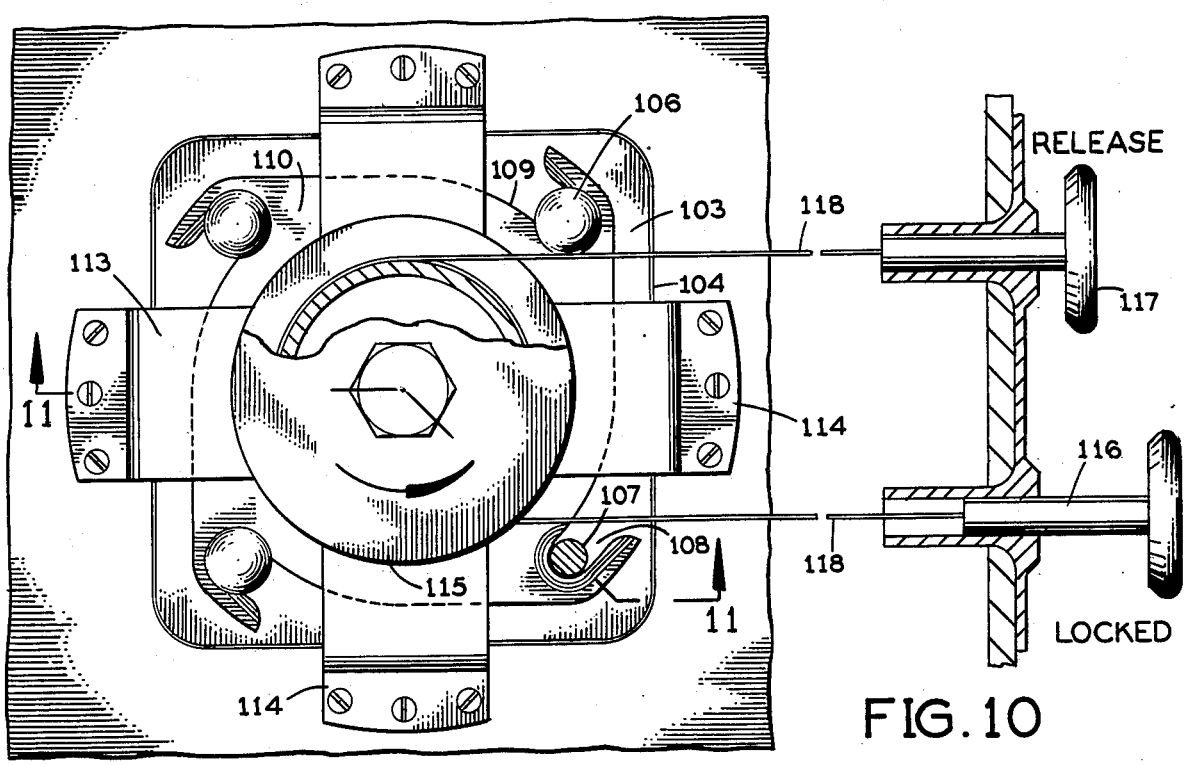
FIG. 10 is a horizontal top-down view of an embodiment of the invention having a mechanically releasable valve head which drops away when deployed.
Figure 11:
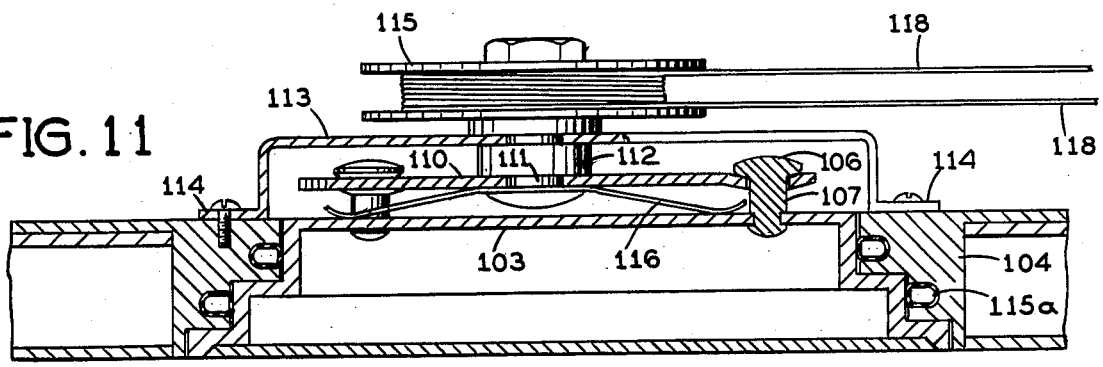
FIG. 11 is a cross-sectional side view of the embodiment of FIG. 10 showing details of the release and the sealing arrangement, seen along the line 11—11 of FIG. 10.

Still another embodiment of the invention is shown in top-down view in FIG. 10 and a side-view in FIG. 11. The hollow valve head 103 is, in this embodiment, releasably attached through short bolts 107 with heads 106 received in tangentially oriented locking slots 108 formed in the periphery 109 of a generally planar, rotatable horizontal locking disc 110.

The locking disc 110 is at its center 111 attached to a rotatable short vertical shaft 112 which is in turn rotatably attached to a horizontal bridge 113 which is rigidly at its ends 114 attached to the bottom of the fuel tank by means of screws, rivets or the like. The short shaft 112 has at its upper end, attached thereto, a horizontally oriented pulley 115 which in turn engages two handles, the locking handle 116 and a release handle 117 through steel cables 118, wound around the pulley 115. The handles 116 and 117 are positioned within reach of the pilot, who, in an emergency situation, can grab the release handle 117, which causes the locking disc 110 to rotate counter-clockwise as shown by the arrow, thereby releasing the valve head 103 at the bolts 107 and allowing the valve head 103 to drop out of the valve seat 104, as seen in FIG. 12, thereby dumping the fuel in the fuel tank.

In the contemplated use of this embodiment, it will be activated by the pilot only in an extreme emergency when a forced landing is imminent.

Figure 12:
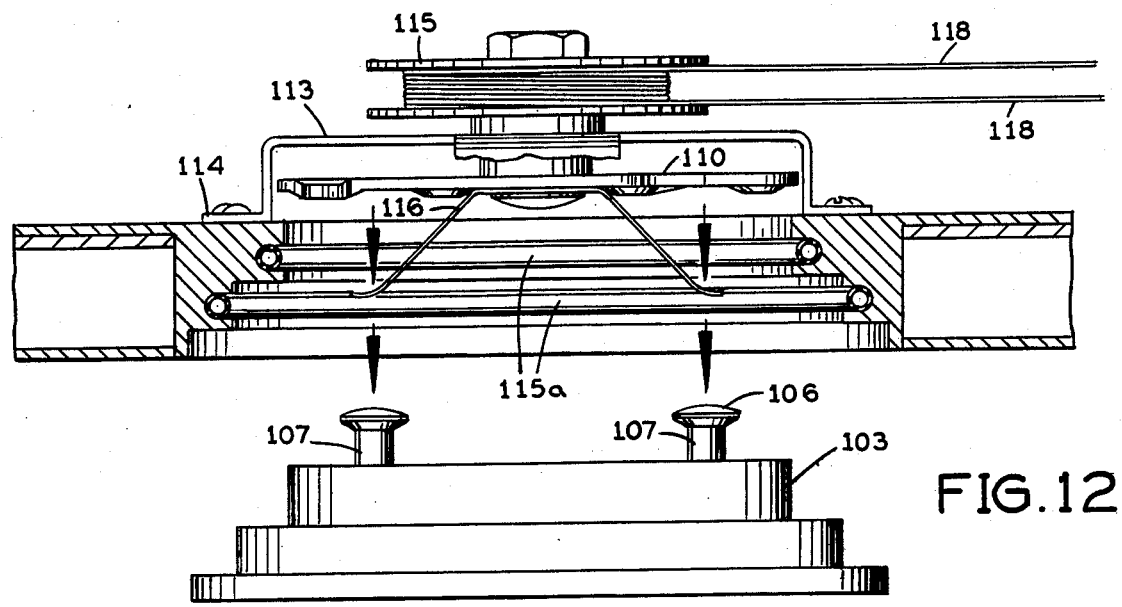
FIG. 12 is a cross-sectional side view of the invention according to FIGS. 10 and 11 showing deployment of the release valve head.

In the above embodiment of fuel dumping valve, shown in FIGS. 10, 11 and 12, valve seals 115a may advantageously be inserted between the valve head 103 and the valve seat 104. A leaf spring 116 or other suitable spring configuration may also advantageously be inserted in compressed condition in the space between the valve head 103 and the bridge 113 and will operate to quickly and positively expel the valve seat 103 against the friction between the valve seat 104 and the valve head 103 and the seals 115.

Figure 13:
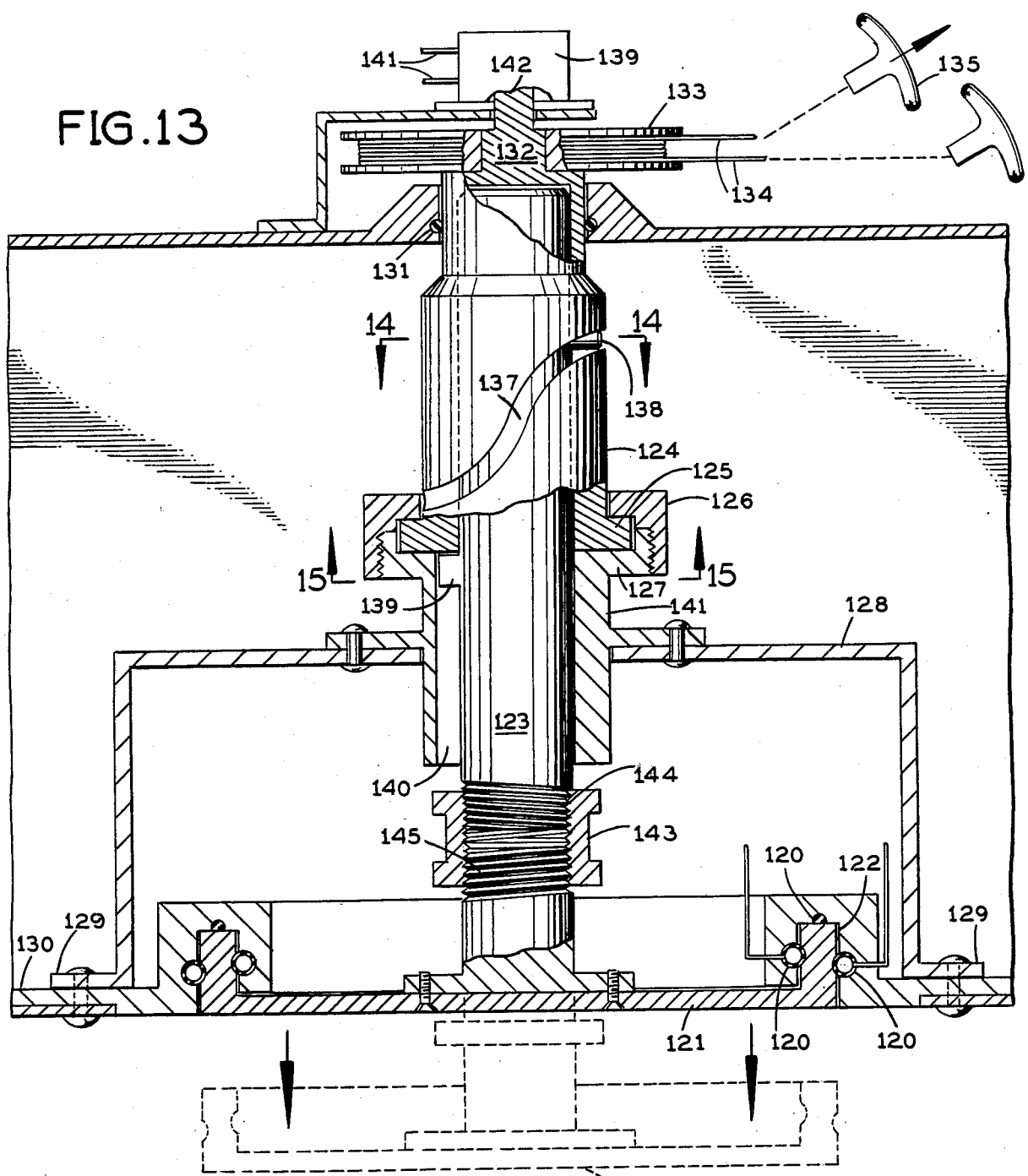
FIG. 13 is a fragmentary, vertical, cross-sectional side view of an embodiment of the invention having a mechanically releasable valve head with inflatable seals and having a spiral groove for activating the valve.

In still another manually releasable embodiment of the fuel dumping valve shown in a side-view in FIG. 13, a hydraulically inflatable seal 120 is provided between the valve head 121 and the valve seat 122.

The valve head 120 is attached to a vertical cylindrical valve stem 123 which is received into a hollow cylindrical sleeve 124, having a radially projecting flange 125 disposed rotatably between a collar nut 126 and a lower flange 127, which is supported by the lower sleeve 141, which is in turn vertically, rigidly positioned with respect to a bridge 128. The bridge 128 is attached at its ends 129 to the bottom 130 of the fuel tank by means of screws or the like.

The sleeve 124, rotatably suspended at its lower end at the flange 125 and at its upper end at a ball bearing 131, has at its upper end 132 a horizontal pulley 133 attached thereto and can be rotated by the pulley. A steel cable 134 is wound around the pulley and has at its ends two handles, the release handle 135 and the closing handle 136, attached thereto. The handles are positioned within reach of the pilot and serve to operate the fuel dumping valve in an emergency. The sleeve 124 has a helical spiral groove 137 which serves to receive a radially projecting first pin 138 attached to the stem 123. When the sleeve 124 is rotated, the stem, which is prevented from rotating by a second radially projecting pin 139, also attached to the stem 123 and slidably movable in a vertical groove 140, is moved up or down as the first pin 138 follows the helical groove 137. The valve head 121, which is attached to the valve stem 123, is also moved up and down between an upper closed position, shown in full lines, and a lower, open position shown in phantom lines at 121'.

The inflatable seals 120 are supplied with hydraulic fluid under pressure under control of a rotary hydraulic valve 139 which engages a second extension 142 at the upper end of the valve stem 123. The rotary valve 139 is attached to the stem 123 in such a way that as the sleeve 124 starts turning at the beginning of the opening cycle, the valve 139 disconnects hydraulic pressure from the seals 120.

An internally threaded adjustment collar 143 interposed between an upper and a lower part of the stem 123 is engaging the two stem parts in two oppositely threaded connections 144 and 145, such that, if the collar 143 is turned in one direction, the two facing ends of the stem parts are drawn closer together or are pushed farther apart, depending upon the direction in which the collar 143 is turned.

Figure 14:
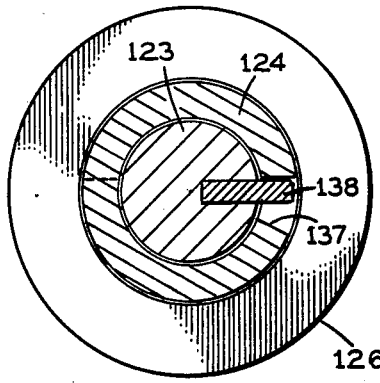
FIG. 14 is a fragmentary detail view of the embodiment of FIG. 13 seen along the line 14—14 thereof.
Figure 15:
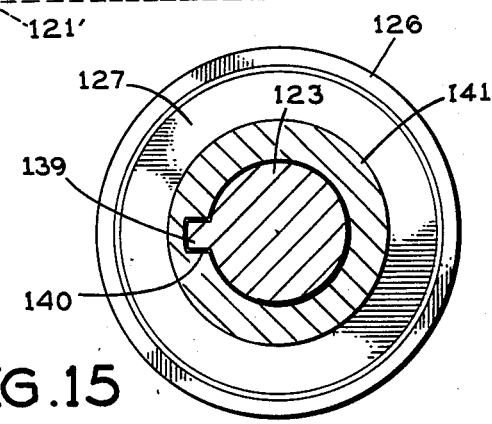
FIG. 15 is a fragmentary detail view of the embodiment of FIG. 13 seen along the line 15—15 thereof.

FIG. 14 shows a cross-section through the valve stem taken along the line 14—14 of FIG. 13, showing the first pin 138 in the helical groove 137, and FIG. 15 shows a cross-section through the valve stem 123 taken along the line 15—15 of FIG. 13.

FIG. 9 shows a schematic circuit diagram of the hydraulic system used to control the various embodiments of the fuel dumping valve described hereinabove. The hydraulic system is conventional in its structure, and uses symbols that are generally considered standard for hydraulic engineering diagrams. In FIG. 9, an engine 158 drives a hydraulic pump 157 which charges a hydraulic accumulator 150 with fluid from the reservoir 162, through a one-way check valve 156. The fluid is accumulated under pressure in the space 153, which is formed by a fluid-tight bellows 152. As the space 153 is filled with fluid, a helical spring 151 is compressed and maintains the fluid in the space 153 and the adjoining tubing 159 under pressure. The pump 157 may be replaced or supplemented by a hand-driven pump for standby purposes, but is not shown.

In FIG. 9, the circles 163 may represent the inflatable seals 51 of FIG. 4, 81 and 82 of FIG. 5, or 120 of FIG. 13. The inflatable seals 163 are controlled by a hydraulic valve 155, which may represent the valve 47 of FIG. 4 or the valve 74 of FIG. 5. The valve 155 is shown in the position in which the seals are inflated through the channel 160 of the valve. The valve spool may be moved to the right by the activator 154, which brings the channel 161 in alignment with the seals 163, which are then deflated by returning the fluid to the reservoir 162.

A second control valve 164 controls the hydraulic cylinder 166. The cylinder 166 may represent the valve actuating cylinder 19 of FIG. 2 or the hydraulic motor 80 of FIG. 5, or the locking pin actuating cylinder 95 of FIG. 6, of the locking pin retracting motor 46 of FIG. 4.

The control valve 164 may represent the control valve 50 of FIG. 4 or the valve 76 of FIG. 6. The valve 164 is shown with its valve spool in the position in which the rod end of the cylinder 166 is energized through the channel 167 of the valve spool. In a second position of the valve 164, the channel 166 connects the cylinder rod end to the reservoir 162.

As stated above, the hydraulic system of FIG. 9 is conventional.

I claim:

1. A fuel dumping valve for fast evacuation of a fuel tank for an aircraft comprising:
   a valve head disposed in the underside of a fuel tank, the valve head having an open position for releasing fuel from the tank, and a closed position;
   at least one generally vertical valve stem attachted to said valve;

a valve seat matching the valve head for receiving the valve head in the closed position;

means for guiding said valve head between said open and said closed positions;

actuating means for moving said valve head between said open and said closed position; and sealing means for sealing said valve head in its closed position;

at least one generally vertical frame member rigidly attached to the inside bottom of said fuel tank and projecting upward therefrom;

at least one pair of generally parallel levers each pivotally attached, spaced apart a first distance one above the other at one end to said frame member, and spaced apart a second distance at the other end pivotally attached to said valve stem; and wherein said first distance is greater than said second distance thereby causing said valve head to assume a tilted position when extended, said tilt defined as a small angle $\alpha$ between said valve stem and the plane perpendicular to the plane defined by the valve seat such that said valve head is sloping downward and forward when extended for catching the flow of air under said wing.

2. A fuel dumping valve according to claim 1 wherein said means for guiding said valve head further comprises:

at least one generally vertical frame member rigidly attached to the inside bottom of said fuel tank and projecting upward therefrom;

at least one pair of generally parallel levers each pivotally attached, spaced apart a first distance one above the other at one end to said frame member, and spaced apart a second distance at the other end pivotally attached to said valve stem.

3. A fuel dumping valve according to claim 2 comprising two pairs of generally parallel levers.

4. A fuel dumping valve according to claim 3 wherein said two pairs of levers are disposed in two vertical planes parallel with the body of said aircraft.

5. A fuel dumping valve according to claim 4 wherein said frame member is closer to the front of said aircraft than said valve stem.

6. A fuel dumping valve according to claim 3 wherein said operating means for moving said valve head comprises a hydraulic cylinder, said cylinder pivotally attached at one end to the inside bottom of said fuel tank and at the other end to a transverse rod, said rod transversely oriented and attached at each end to each of the upper levers.

7. A fuel dumping valve according to claim 1 wherein said sealing means is an O-ring disposed in a peripheral groove in said valve seat.

8. Fuel dumping valve according to claim 1 wherein said sealing means further comprise:

at least one hydraulically inflatable seal disposed in a groove in the perimeter of said valve seat;

said inflatable seal connected to a source of hydraulic fluid under pressure and operatively responsive to a second hydraulic control valve for inflating and deflating said inflatable seal.

9. Fuel dumping valve according to claim 6 further comprising a hydraulic control circuit having:

at least one hydraulic pump for providing hydraulic fluid under pressure; and at least one hydraulic control valve positioned within reach of the pilot of said aircraft for controlling said hydraulic cylinder.

10. Fuel dumping valve according to claim 9 further comprising a hydraulic fluid accumulator for storing hydraulic fluid under pressure.

11. Fuel dumping valve according to claim 10 wherein said accumulator comprises a bellows for storing said fluid under pressure, and a spring acting on said bellows for maintaining pressure on said bellows.

* * * * *